(12) United States Patent
Sato (10) Patent No.: US 7,248,606 B2
(45) Date of Patent: Jul. 24, 2007

(54) RADIO APPARATUS AND BASE STATION APPARATUS

(75) Inventor: Takaaki Sato, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/485,957

(22) PCT Filed: Jul. 14, 2003

(86) PCT No.: PCT/JP03/08883

§ 371 (c)(1),
(2), (4) Date: Feb. 6, 2004

(87) PCT Pub. No.: WO2004/012370

PCT Pub. Date: Feb. 5, 2004

(65) Prior Publication Data

US 2004/0235501 A1    Nov. 25, 2004

(30) Foreign Application Priority Data

Jul. 29, 2002    (JP)    ............................... 2002-220318

(51) Int. Cl.
*H04J 3/12* (2006.01)
*H04Q 7/20* (2006.01)

(52) U.S. Cl. ...................... 370/524; 370/328; 370/338; 370/252; 370/522; 455/525; 455/445; 455/517; 455/3.01

(58) Field of Classification Search ................ 455/522, 455/69, 442, 436, 464, 515, 135, 445, 517, 455/446, 3.01, 3.03; 370/347, 335, 338, 370/516, 468, 412, 350, 329, 208, 524, 328, 370/252, 522; 709/200; 375/295, 261, 147; 714/758, 776

See application file for complete search history.

(56) References Cited

U.S. PATENT DOCUMENTS 5,590,404 A    12/1996    Sato et al.

(Continued)

FOREIGN PATENT DOCUMENTS

JP    7131845    5/1995
WO    9813956    4/1998

OTHER PUBLICATIONS

PCT International Search Report dated Sep. 30, 2003.

(Continued)

*Primary Examiner*—George Eng
*Assistant Examiner*—Huy Phan
(74) *Attorney, Agent, or Firm*—Stevens, Davis, Miller & Mosher, LLP (57) ABSTRACT

A radio apparatus and base station apparatus that flexibly respond to an increase or decrease in the number of users without being constrained by the number of users. An A-DPCH signal processing section (106) generates dedicated transmission signals corresponding in number to users multiplexed based on the number of users for each sector input from a control station apparatus and outputs the multiplexed signal to a multiplexing section (105). An HSDPA signal processing section (107) selects a transmission destination sector based on an instruction from a base station control section, generates multiplexed transmission data and outputs the multiplexed data to the multiplexing section (105). The multiplexing section (105) code-multiplexes dedicated transmission signals of A-DPCH and packet data in HSDPA communication for each sector and outputs the multiplexed data to a radio transmission section (104). The radio transmission section (104) transmits the multiplexed transmission signal input from the multiplexing section (105) from an antenna (101).

8 Claims, 8 Drawing Sheets

U.S. PATENT DOCUMENTS

| | | | |
|---|---|---|---|
| 6,119,004 A | 9/2000 | Yamada et al. | |
| 2003/0002472 A1* | 1/2003 | Choi et al. | 370/347 |
| 2003/0039217 A1* | 2/2003 | Seo et al. | 370/318 |
| 2003/0157953 A1* | 8/2003 | Das et al. | 455/522 |
| 2004/0125772 A9* | 7/2004 | Wu et al. | 370/335 |
| 2005/0022098 A1* | 1/2005 | Vayanos et al. | 714/776 |
| 2005/0025254 A1* | 2/2005 | Awad et al. | 375/295 |
| 2005/0063347 A1* | 3/2005 | Sarkkinen et al. | 370/338 |
| 2005/0068973 A1* | 3/2005 | Taffin et al. | 370/412 |
| 2005/0068990 A1* | 3/2005 | Liu | 370/516 |
| 2005/0075124 A1* | 4/2005 | Willenegger et al. | 455/522 |

OTHER PUBLICATIONS

International Search Report dated Sep. 30, 2003.

"High Speed Downlink Packet Access (HSDPA)—Overall Description", TSGR1#22(01)0787, 5.0 Associated Signaling, TSG-RAN Working Group 1#21, Turin, Italy, Aug. 27-31, 2001, 14 pages.

3GPP TS 25.211 V5.1.0 (Jun. 2002), 3rd Generation Partnership Project; Technical Specification Group Radio Access Network; Physical channels and mapping of transport channels onto physical channels (FDD) (Release 5), Valbonne, France, Jun. 2002, pp. 1-50.

Korean Office Action dated Aug. 17, 2006 with English translation.

"High Speed Downlink Packet Access (HSDPA)—Overall Description,"TSGR 1#22(01)0787, TSG-RAN Working Group 1 #21, Motorola, 14 pages total, Aug. 27, 2001.

* cited by examiner

RADIO APPARATUS AND BASE STATION APPARATUS

TECHNICAL FIELD

The present invention relates to a radio apparatus and base station apparatus used in a radio communication system that performs high-speed packet transmission on a downlink.

BACKGROUND ART

In the field of a radio communication system, there is a proposal-on an HSDPA (High Speed Downlink Packet Access) in which a plurality of communication terminal apparatuses shares high-speed, large-capacity downlink channels to perform high-speed packet transmission on a downlink. The HSDPA uses a plurality of channels such as HS-PDSCH (High Speed—Physical Downlink Shared CHannel), HS-SCCH (Shared Control CHannel of HS-PDSCH) and A-DPCH (Associated—Dedicated Physical CHannel for HS-PDSCH). The A-DPCH is a DPCH (Dedicated Physical CHannel) to be used as an auxiliary channel when an HSDPA transmission is carried out and the channel configuration and handover control thereof, etc., are the same as those of the DPCH described in 3 GPP TS25.211 v5.1.0.

The HS-PDSCH is a shared channel in the downlink direction used for packet transmission. The HS-SCCH is a shared channel in the downlink direction and carries information on resource allocation (TFRI: Transport-format and Resource related Information) and information on control of H-ARQ (Hybrid-Automatic Repeat reQuest), etc.

The A-DPCH is a dedicated auxiliary channel in the uplink and downlink directions, and therefore as many A-DPCHs as users are necessary. The A-DPCH transmits pilot signals and TPC commands, etc., and in the uplink direction, it transmits an ACK signal or NACK signal, CQI (Channel Quality Indicator) signal in addition to pilot signals and TPC commands. The ACK signal is a signal indicating that a high-speed packet on an HS-PDSCH sent from a base station apparatus has been correctly demodulated by a communication terminal apparatus and the NACK signal is a signal indicating that a high-speed packet on an HS-PDSCH sent from a base station apparatus has not been correctly demodulated by a communication terminal apparatus. Furthermore, the CQI is a signal indicating a modulation scheme and coding rate of packet data that can be demodulated by each communication terminal apparatus.

In such an HSDPA communication, in order to meet demands for enhancement of communication speeds and transmission/reception of large-volume data such as moving images in recent years, packet data is sent from a base station apparatus to the user using a technology for selecting an appropriate modulation scheme and a coding rate for error correction according to the user's communication environment and an H-ARQ technology. For this reason, scheduling with regard to a decision by the user on transmission of packet data, decision on whether or not to resend packets or decision on the modulation scheme and coding rate must be made not at a control station apparatus but at a base station apparatus.

A cell which is an area in which mobile station apparatuses can communicate with one base station apparatus is further divided into a plurality of areas called "sectors." The above described scheduling is performed sector by sector, and therefore the base station apparatus is provided with transmission/reception signal processing circuits using a plurality of A-DPCHs corresponding to their respective sectors and transmission signal processing circuits using HS-PDSCHs and HS-SCCHs. These A-DPCH, HS-PDSCH and HS-SCCH processing circuits together form one processing circuit.

Furthermore, the A-DPCH is a user dedicated channel, and therefore there are as many A-DPCHs as users. Then, when a user moves, the user may move among a plurality of sectors, and therefore processing circuits provided for each sector must secure as many A-DPCHs as all users who can communicate in the cell of each base station apparatus.

Furthermore, a user's A-DPCH which carries out an HSDPA communication is fixedly allocated for an HSDPA communication and a CQI signal, etc., is sent using the A-DPCH.

However, in the case of a conventional radio apparatus and base station apparatus, when the base station apparatus performs scheduling, the processing circuits provided for each sector must secure A-DPCHs corresponding to all users which can communicate in the cell of the base station apparatus in which those processing circuits are provided, and therefore there are constraints on the number of A-DPCHs that can be accommodated in each transmission/reception signal processing circuit depending on the scale of hardware, which results in a problem that the number of users is limited. Furthermore, even in an initial stage in which an HSDPA transmission system is introduced and there are not so many users who perform HSDPA communications, the system needs to secure the number of A-DPCHs to be used for HSDPA transmissions from the beginning in anticipation of an increase in the number of users in the future, which results in waste of equipment and in the case where the number of users increases drastically, all HSDPA systems need to be additionally provided, which results in a problem that such a system cannot flexibly respond to an increase/decrease in the number of users. Furthermore, since A-DPCHs are fixedly assigned for HSDPA communications, A-DPCH scan not be used for communications other than HSDPA communications, resulting in a problem that it is not possible to use free A-DPCHs effectively.

DISCLOSURE OF INVENTION

It is an object of the present invention to eliminate constraints on the number of users, flexibly respond to an increase/decrease in the number of users and use free channels effectively.

A subject of the present invention is to separate an A-DPCH signal processing section from an HSDPA signal processing section and change the number of A-DPCH signal processing blocks which are mounted in an A-DPCH signal processing section according to an increase/decrease in the number of users. Another subject of the present invention is to distribute A-DPCH processing circuits in the A-DPCH signal processing section to sectors according to the number of users carrying out HSDPA communication sector by sector.

A radio apparatus according to an aspect of the present invention comprises dedicated channel signal processing sections corresponding in number to users that generate dedicated transmission signals for respective users and separate signaling information from received signals of the respective users, a high-speed transmission channel signal processing section that generates packet data based on the signaling information and a transmission section that transmits the dedicated transmission signals and packet data.

A transmission method according to another aspect of the present invention comprises a step of generating dedicated transmission signals corresponding in number to users for their respective users, a step of separating signaling information from received signals of the respective users, a step of generating packet data based on the signaling information and a step of transmitting the dedicated transmission signals and packet data.

BEST MODE FOR CARRYING OUT THE INVENTION

With reference now to the attached drawings, embodiments of the present invention will be explained in detail below.

Embodiment 1

Figure 1:
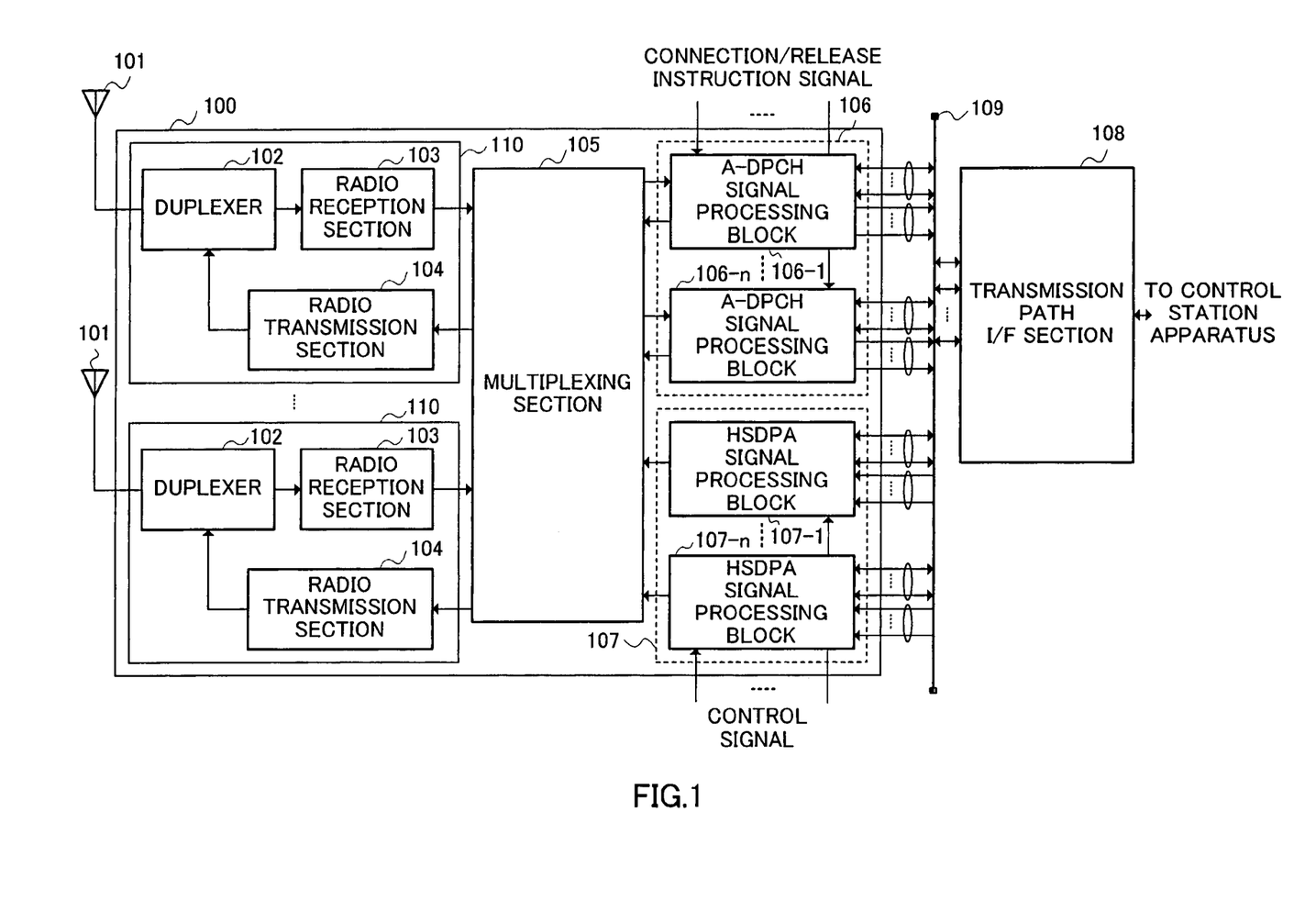
FIG. 1 is a block diagram showing a configuration of a radio apparatus according to Embodiment 1 of the present invention.
Figure 2:
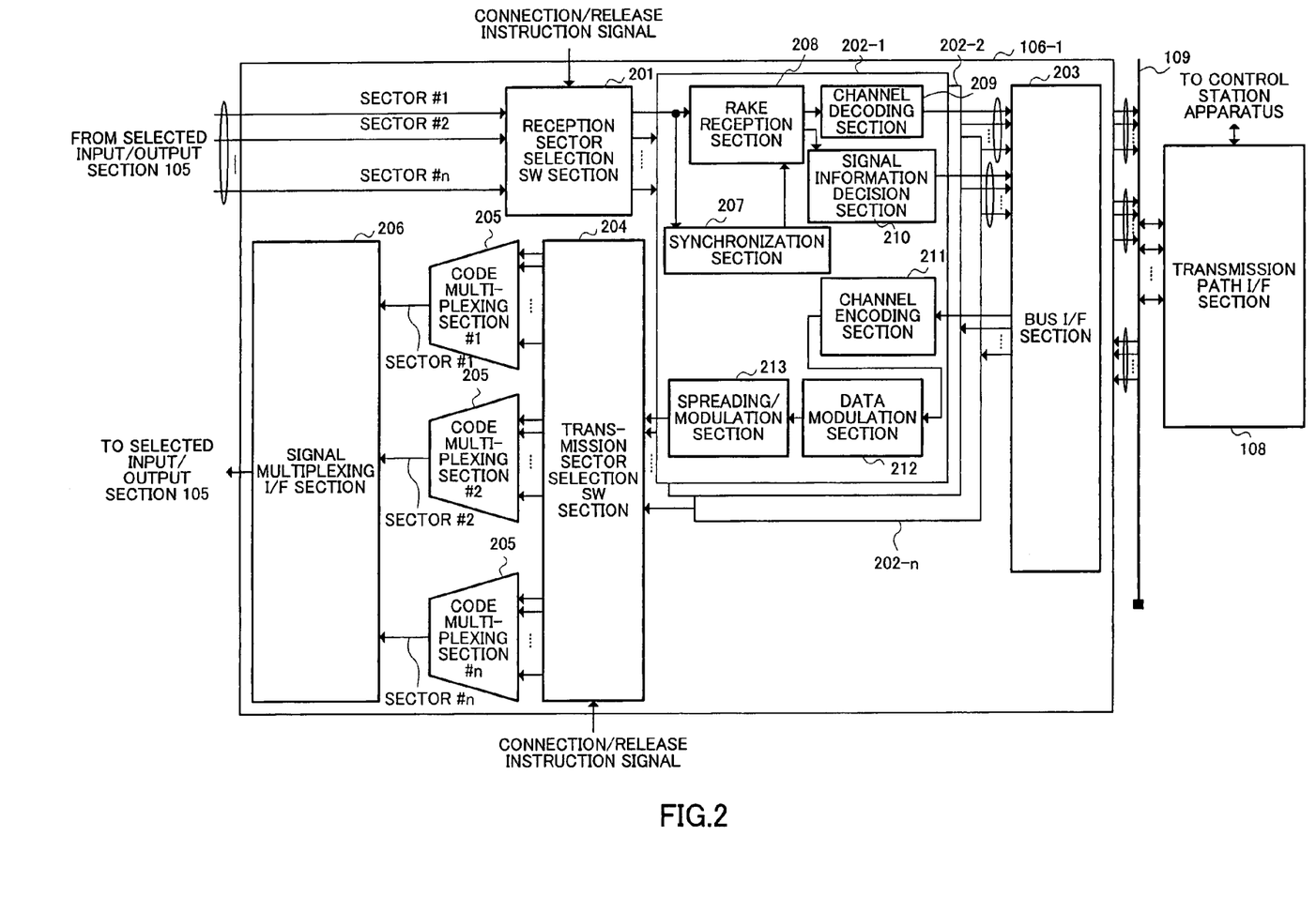
FIG. 2 is a block diagram showing a configuration of an A-DPCH signal processing block according to Embodiment 1 of the present invention.
Figure 3:
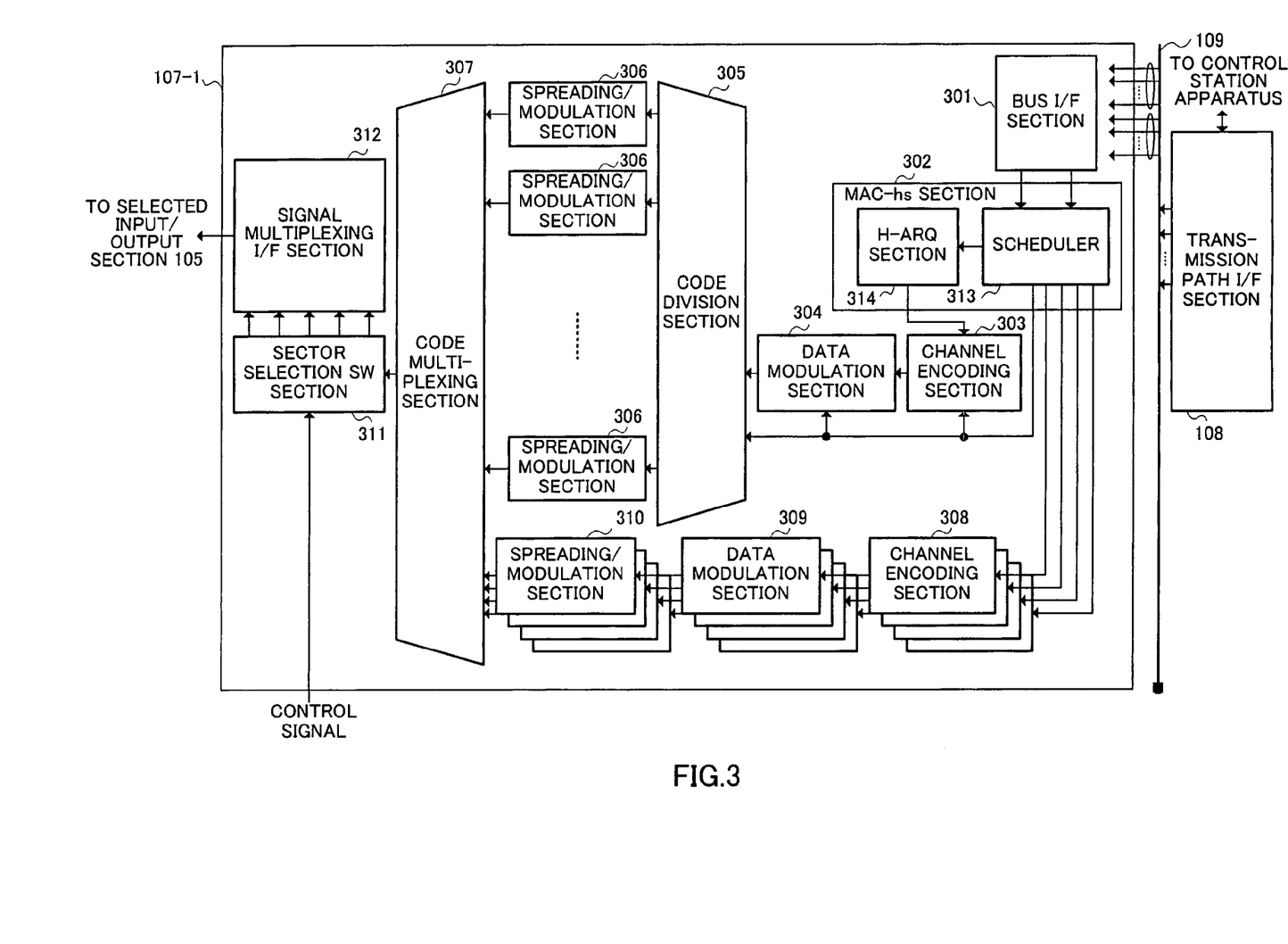
FIG. 3 is a block diagram showing a configuration of an HSDPA signal processing block according to Embodiment 1 of the present invention.

FIG. 1 illustrates a configuration of a radio apparatus 100 according to this embodiment, FIG. 2 illustrates a configuration of each of A-DPCH signal processing blocks 106-1 to 106-$n$ and FIG. 3 illustrates a configuration of each of HSDPA signal processing blocks 107-1 to 107-$n$.

First, the configuration of the radio apparatus 100 will be explained using FIG. 1. The radio apparatus 100 according to this embodiment is principally constructed of an antenna 101, a duplexer 102, a radio reception section 103, a radio transmission section 104, a multiplexing section 105, an A-DPCH signal processing section 106 and an HSDPA signal processing section 107. The duplexer 102, radio reception section 103 and radio transmission section 104 constitute a radio section 110. There are the same number of radio sections 110 as the number obtained by multiplying the number of sectors of a base station apparatus by the number of carriers.

The duplexer 102 separates a received signal received from the antenna 101 from a transmission signal input from the radio transmission section 104, outputs the received signal received from the antenna 101 to the radio reception section 103 and transmits the transmission signal input from the radio transmission section through the antenna 101.

The radio reception section 103 down-converts the received signal input from the duplexer 102 from a signal with radio frequency to a baseband signal and outputs the baseband signal to the multiplexing section 105.

The radio transmission section 104 modulates a transmission signal input from the multiplexing section 105 from a baseband signal to a signal with radio frequency and outputs the modulated signal to the duplexer 102.

The multiplexing section 105 outputs the received signal received by the radio reception section 103 to each of the A-DPCH signal processing blocks 106-1 to 106-$n$ of the A-DPCH signal processing section 106. Furthermore, the multiplexing section 105 code-multiplexes a transmission signal input from each of the A-DPCH signal processing blocks 106-1 to 106-$n$ of the A-DPCH signal processing section 106 and a transmission signal input from each of the HSDPA signal processing blocks 107-1 to 107-$n$ for each sector of each carrier and outputs the multiplexed signal to the radio transmission section 104.

The A-DPCH signal processing section 106 is provided with a plurality of A-DPCH signal processing blocks 106-1 to 106-$n$ which is a dedicated channel signal processing section. There are as many A-DPCH signal processing blocks 106-1 to 106-$n$ as users. The A-DPCH signal processing blocks 106-1 to 106-$n$ decode dedicated data for their respective users from the received signal input from the multiplexing section 105, output the decoded data to a transmission path I/F section 108 through a cell bus 109, separate the received signal into the dedicated data of the respective users and signaling information and output the separated signaling information to the cell bus 109. Furthermore, the A-DPCH signal processing blocks 106-1 to 106-$n$ code transmission signals of the respective users input from the transmission path I/F section 108 through the cell bus 109, spread and modulate the transmission signals using spreading codes, generate dedicated transmission signals of the respective users and then output the dedicated transmission signals to the multiplexing section 105. Details of the A-DPCH signal processing blocks 106-1 to 106-$n$ will be described later. Here, the signaling information is a 1-bit Ack signal, 1-bit Nack signal and 5-bit CQI signal according to the description of 3 GPP TS25.212 v5.1.0. The number of bits of Ack signal, Nack signal and CQI signal can be determined arbitrarily.

The cell bus 109 is a bus intended for transmitting data between the transmission path I/F section 108, A-DPCH signal processing blocks 106-1 to 106-$n$ and HSDPA signal processing blocks 107-1 to 107-$n$ through an ATM (Asynchronous transfer mode) cell.

The HSDPA signal processing section 107 is provided with a plurality of HSDPA signal processing blocks 107-1 to 107-$n$ which is a high-speed transmission channel signal processing section. The HSDPA signal processing blocks 107-1 to 107-$n$ perform scheduling using the signaling information input from the cell bus 109, adaptively modulate HS-PDSCH packet data and HS-SCCH packet data based on the scheduling, spread and modulate the packet data using spreading codes and then output the data to the multiplexing section 105.

Then, the configuration of each of the A-DPCH signal processing blocks 106-1 to 106-$n$ and HSDPA signal processing blocks 107-1 to 107-$n$ will be explained using FIG. 2 and FIG. 3. First, the configuration of each of the A-DPCH signal processing blocks 106-1 to 106-$n$ will be explained. The configurations of all the A-DPCH signal processing blocks 106-1 to 106-*n* are the same except that A-DPCH processing circuits 202-1 to 202-*n* vary depending on the number of users, and therefore the configuration of only one A-DPCH signal processing block 106-1 will be explained. The A-DPCH signal processing block 106-1 is principally constructed of a reception sector selection switch (SW) section 201, A-DPCH processing circuits 202-1 to 202-*n*, a bus I/F section 203, a transmission sector selection switch section 204, code multiplexing sections 205 and a signal multiplexing I/F section 206. Furthermore, each of the A-DPCH processing circuits 202-1 to 202-*n* is principally constructed of a synchronization section 207, a RAKE reception section 208, a channel decoding section 209, a signaling information decision section 210, a channel encoding section 211, a data modulation section 212 and a spreading/modulation section 213. Furthermore, there is a plurality of A-DPCH processing circuits 202-1 to 202-*n* according to the number of users and its number can be increased or decreased according to the number of users.

The reception sector selection switch section 201 decides allocation of received signals of the respective sectors input from the multiplexing section 105 to the A-DPCH processing circuits 202-1 to 202-*n* and outputs the received signals of the respective sectors to their respective allocated A-DPCH processing circuits 202-1 to 202-*n*. At this time, the reception sector selection switch section 201 allocates more A-DPCH processing circuits to sectors with more users and allocates fewer A-DPCH processing circuits to sectors with fewer users based on connection instruction signals or release instruction signals of HSDPA packet communication for the respective sectors input from a control section (not shown).

The bus I/F section 203 ATM-cellularizes the received signal output from the channel decoding section 209 and outputs the signal to the transmission path I/F section 108 through the cell bus 109 and at the same time ATM-cellularizes the signaling information output from the signaling information decision section 210 and outputs the signal to the cell bus 109. When signals are ATM-cellularized, a VPI (Virtual path identifier) and a VCI (Virtual channel identifier), etc., for specifying the transmission path I/F section 108 are set as the destination at least in an ATM cell header in the case of a received signal, and a VPI and VCI, etc., for specifying the HSDPA signal processing blocks 107-1 to 107-*n* corresponding to the A-DPCH processing circuits 202-1 to 202-*n* are likewise set as the destinations at least in the ATM cell header in the case of signaling information. Furthermore, the dedicated data of the respective users input from the transmission path I/F section 108 to the A-DPCH signal processing block 106-1 is output to the channel encoding section 211. Data is sent/received between the control station apparatus which is a higher level apparatus and the base station apparatus through ATM cell transmission.

The transmission sector selection switch section 204 allocates transmission signals input from the spreading/modulation sections 213 to the code multiplexing sections 205 for the respective sectors. When allocating the transmission signals, the transmission sector selection switch section 204 allocates more A-DPCHs to sectors with more users and allocates fewer A-DPCHs to sectors with fewer users based on connection instruction signals or release instruction signals of HSDPA packet communication for the respective sectors input from the control section (not shown). Here, the connection instruction signal or release instruction signal is a signal output from the control section (not shown) which controls the entire base apparatus based on instructions from the control station apparatus (not shown) which is the higher level station of the base station apparatus.

The code multiplexing section 205 multiplexes dedicated transmission signals of a plurality of users input from the transmission sector selection switch section 204 and outputs the multiplexed signal to the signal multiplexing I/F section 206. There are as many code multiplexing sections 205 as sectors. Since transmission signals to be multiplexed by the code multiplexing section 205 are allocated by the transmission sector selection switch section 204, the number of the transmission signals varies from one code multiplexing section 205 to another.

The signal multiplexing I/F section 206 outputs the transmission signals input from the code multiplexing sections 205 to the multiplexing section 105.

The synchronization section 207 creates a delay profile corresponding to a received signal, selects a path to be demodulated at the RAKE reception section 208 and outputs timing information for demodulating each path to the RAKE reception section 208.

The RAKE reception section 208 demodulates the received signal received as a direct signal and delay signal based on the timing information corresponding to each path specified by the synchronization section 207, RAKE-combines the received signals and outputs the received signals to the channel decoding section 209 and signaling information decision section 210.

The channel decoding section 209 decodes the received signal input from the RAKE reception section 208 and outputs the decoded signal to the bus I/F section 203.

The signaling information decision section 210 separates the signaling information from the received signal input from the RAKE reception section 208 and outputs the separated signaling information to the bus I/F section 203.

The channel encoding section 211 encodes a transmission signal input from the bus I/F section 203 and outputs the encoded transmission signal to the data modulation section 212.

The data modulation section 212 carries out modulation processing on the transmission signal input from the channel encoding section 211 and outputs the modulated transmission signal to the spreading/modulation section 213.

The spreading/modulation section 213 carries out spreading processing on the transmission signal input from the data modulation section 212 and outputs the spread signal to the transmission sector selection switch section 204.

Here, an A-DPCH in the A-DPCH signal processing block 106-1 is subjected to closed loop transmission power control by a transmission power control section (not shown), and therefore the transmission section and reception section relating to the A-DPCH are incorporated in one of the A-DPCH processing circuits 202-1 to 202-*n*.

Then, the configuration of each of the HSDPA signal processing blocks 107-1 to 107-*n* will be explained using FIG. 3. Since the configurations of all the HSDPA signal processing blocks 107-1 to 107-*n* are the same except in that they differ in the number of spreading/modulation sections 306, spreading/modulation sections 310, data modulation sections 309 and channel encoding sections 308, the configuration of only one HSDPA signal processing block 107-1 will be explained. The HSDPA signal processing block 107-1 is principally constructed of a bus I/F section 301, a MAC-hs section 302, a channel encoding section 303, a data modulation section 304, a code division section 305, spreading/modulation sections 306, a code multiplexing section 307, channel encoding sections 308, data modulation sections 309, spreading/modulation sections 310, a sector selection switch section 311 and a signal multiplexing I/F section 312. Furthermore, the MAC-hs section 302 is principally constructed of a scheduler 313 and an H-ARQ section 314.

The bus I/F section 301 outputs packet data input from a transmission data generation section (not shown) through the transmission path I/F section 108 and cell bus 109 and signaling information output from the signaling information decision section 210 and input through the cell bus 109 to the scheduler 313.

The channel encoding section 303 carries out encoding on the packet data input from the H-ARQ section 314 at a high coding rate for users having a good communication environment based on the scheduling result of the scheduler 313, while it carries out encoding at a low coding rate for users having a bad communication environment, and outputs the transmission signal encoded at a coding rate according to the communication environment of each user at the destination to the data modulation section 304.

Based on the scheduling result of the scheduler 313, the data modulation section 304 carries out modulation on the packet data input from the channel encoding section 303 according to a multi-value modulation scheme such as 16QAM for users having a good communication environment, while it carries out modulation according to a modulation scheme such as QPSK for users having a bad communication environment, and outputs the transmission signal modulated based on the modulation scheme according to the communication environment of each user to the code division section 305.

The code division section 305 divides the packet data input from the data modulation section 304 into as many portions as users and outputs the divided packet data portions to the respective spreading/modulation sections 306.

The spreading/modulation section 306 carries out spreading processing on the packet data input from the code division section 305 and outputs the spread data to the code multiplexing section 307. In this case, the spreading/modulation sections 306 carry out spreading processing on packet data using different spreading codes.

The channel encoding section 303, data modulation section 304, code division section 305 and spreading/modulation section 306 constitute an HS-PDSCH transmission section for transmitting packet data transmitted from the control station apparatus (not shown).

The code multiplexing section 307 multiplexes a plurality of packet data input from the spreading/modulation sections 306 and a plurality of packet data input from the spreading/modulation sections 310 and outputs the multiplexed packet data to the sector selection switch section 311.

The channel encoding section 308 encodes the packet data input from the scheduler 313 and outputs the encoded packet data to the data modulation section 309. The packet data encoded by the channel encoding section 308 is the packet data for notifying each user of the information on the coding rate used by the channel encoding section 303 and the modulation scheme used by the data modulation section 304.

The data modulation section 309 carries out modulation processing on the packet data input from the channel encoding section 308 and outputs the modulated packet data to the spreading/modulation section 310.

The spreading/modulation section 310 carries out spreading processing on the packet data input from the data modulation section 309 and outputs the spread packet data to the code multiplexing section 307.

The channel encoding section 308, data modulation section 309 and spreading/modulation section 310 constitute an HS-SCCH transmission section for notifying each user of the coding rate and modulation scheme used for encoding and modulation of packet data. The sector selection switch section 311 selects a sector to which data input from the code multiplexing section 307 is sent based on a control signal from the control section (not shown) which controls the entire base station and outputs the data to the signal multiplexing I/F section 312.

The signal multiplexing I/F section 312 outputs the packet data input from the sector selection switch section 311 to the multiplexing section 105.

The scheduler 313 carries out scheduling on users who exist in the same sector to which data is sent using the packet data and signaling information input from the bus I/F section 301. The scheduler 313 controls the code division section 305, data modulation section 304 and channel encoding section 303 based on the scheduling result.

When received data is subjected to error detection/decoding and then error detection, and an error is detected as a result of the error detection, the H-ARQ section 314 generates packet data including a retransmission request signal for requesting retransmission of the received data containing the error and outputs the packet data to the channel encoding section 303.

Then, the method of mounting the A-DPCH signal processing blocks 106-1 to 106-*n* and HSDPA signal processing blocks 107-1 to 107-*n* in the base station apparatus will be explained using FIG. 1. When, for example, each one of the A-DPCH signal processing blocks 106-1 to 106-*n* carries out processing corresponding to one carrier and is constructed in such a way as to be able to perform A-DPCH transmission/reception corresponding to 32 channels per carrier, the A-DPCH signal processing blocks 106-1 to 106-*n* are each provided with 32 A-DPCH channels. That is, there are 32 A-DPCH processing circuits 202-1 to 202-*n* of the A-DPCH signal processing blocks 106-1 to 106-*n*. Furthermore, the HS-PDSCH transmission section (from the channel encoding section 303 to spreading/modulation section 306) of each of the HSDPA signal processing sections 107-1 to 107-*n* has a maximum of 15 codes and the HS-SCCH transmission section (from the channel encoding section 308 to spreading/modulation section 310) has a maximum of 4 codes.

Furthermore, when one sector uses a maximum of 15 codes of HS-PDSCH per carrier, one MAC-hs section 302 cannot be shared by a plurality of radio sections 110. When the number of codes of HS-PDSCH per carrier is limited to a maximum of 5 codes for one sector, the amount of processing per sector is reduced to approximately ⅓, and therefore one MAC-hs section 302 can be shared by a plurality of sectors, that is, a plurality of radio sections 110 on a time-division basis.

In this case, when the number of users per carrier and per sector is set to 64, the configuration per sector of the radio apparatus 100 requires only one of the HSDPA signal processing blocks 107-1 to 107-*n* and two A-DPCH signal processing blocks 106-1 to 106-*n*. Thus, the radio apparatus 100 only needs to have HSDPA signal processing blocks 107-1 to 107-*n* whose number is equivalent to the number of sectors of the base station apparatus multiplied by the number of carriers introducing HSDPA communication regardless of the number of users. In this way, each base station apparatus only needs to have HSDPA signal processing blocks 107-1 to 107-*n* per sector whose number is equivalent to the number of carriers introducing HSDPA communication multiplied by the maximum number of codes of HS-PDSCH per sector and A-DPCH signal processing blocks 106-1 to **106-*n* whose number is equivalent to the number of carriers introducing HSDPA communication multiplied by the number of users accommodated per sector. The number of A-DPCH channels provided for the A-DPCH signal processing blocks 106-1 to 106-*n* may also be any number other than 32**.

Moreover, when signal processing by software is adopted as the method of realizing the A-DPCH signal processing blocks-106-1 to **106-*n* and HSDPA signal processing blocks 107-1 to 107-*n*, it is possible to adopt the same hardware configuration for the A-DPCH signal processing blocks 106-1 to 106-*n* and the HSDPA signal processing blocks 107-1 to 107-*n*** and switch between the two blocks to be used as the A-DPCH signal processing section or HSDPA signal processing section as required. According to such a method, it is possible, for example, to use a small number of carriers introducing HSDPA at the time of initial introduction and then freely set the ratio of allocation to the A-DPCH signal processing section and HSDPA signal processing section when the number of carriers introduced is increased to expand the number of users accommodated later, and thereby flexibly respond to a variety of cases.

Then, the operation of the radio apparatus 100 will be explained. A received signal received through the antenna 101 is output from the multiplexing section 105 to the A-DPCH signal processing blocks 106-1 to **106-*n*. The received signal input to the A-DPCH signal processing blocks 106-1 to 106-*n* is input to the reception sector selection switch section 201 and a received signal from a sector in which a transmitting user exists is output to the RAKE reception section 208 and synchronization section 207 of each of the A-DPCH processing circuits 202-1 to 202-*n*. The received signal input to the RAKE reception section 208 is RAKE-combined based on a synchronization signal of the synchronization section 207 and output to the channel decoding section 209 and signaling information decision section 210. The received signal input to the channel decoding section 209 is subjected to decoding processing and received data is obtained. Furthermore, signaling information is generated from the received signal input to the signaling information decision section 210, the signaling information generated is output to the bus I/F section 203, further output to the cell bus 109 and input to the bus I/F section 301 of each of the HSDPA signal processing blocks 107-1 to 107-*n* through the cell bus 109**.

The signaling information input to the bus I/F section 301 is input to the scheduler 313 and the scheduler 313 performs scheduling based on the signaling information input. On the other hand, packet data input from a transmission data generation section (not shown) to the scheduler 313 through the transmission path I/F section 108 and cell bus 109, bus I/F section 301 is output to the H-ARQ section 314. Then, when some error is detected in the received data, the H-ARQ section 314 generates packet data including a retransmission request signal and the packet data including the retransmission request signal is encoded by the channel encoding section 303 at a coding rate according to the user's communication environment, modulated by the data modulation section 304 based on a modulation scheme according to the user's communication environment and output to the code division section 305. The packet data input to the code division section 305 is subjected to spreading processing at the spreading/modulation sections 306 using spreading codes which differ from one physical channel to another, multiplexed at the code multiplexing section 307 and output to the sector selection switch section 311. The data output to the sector selection switch section 311 is output to the signal multiplexing I/F section 312 in such a way as to be transmitted to the specified sector based on the instruction of the control signal input from the control section (not shown) and output to the multiplexing section 105.

On the other hand, the transmission signal input from the transmission data generation section (not shown) to the bus I/F section 203 through the transmission path I/F section 108 and cell bus 109 is encoded at the channel encoding section 211, modulated at the data modulation section 212, subjected to spreading processing at the spreading/modulation section 213 using spreading codes and output to the transmission sector selection switch section 204. Of the transmission signals input to the transmission sector selection switch section 204, more transmission signals are output to the code multiplexing section 205 corresponding to a sector with more users, while fewer transmission signals are output to the code multiplexing section 205 corresponding to a sector with fewer users, based on connection instruction signals or release instruction signals of HSDPA packet communication for the respective sectors from the control section (not shown). The transmission signals output to the code multiplexing sections 205 are multiplexed, output to the signal multiplexing I/F section 206, output to the multiplexing section 105, multiplexed with the packet data output from the HSDPA signal processing blocks 107-1 to **107-*n* and output from the multiplexing section 105 to the radio transmission section 104**.

When output from the multiplexing section 105 to the radio transmission section 104, the transmission signal multiplexed at the multiplexing section 105 is output to a selected radio transmission section 104 which corresponds to the sector where there exists a destination of the transmission signal multiplexed at the multiplexing section 105. Then, the multiplexed transmission signal is sent from the radio transmission section 104 to the user in the sector corresponding to the destination through the duplexer 102 and the antenna 101.

Then, the operations of the transmission sector selection switch section 204 and reception sector selection switch section 201 depending on whether each user carries out HSDPA communication or not and the operation of the sector selection switch section 311 corresponding to a maximum packet transmission rate of each sector will be explained.

First, a case where all users carry out HSDPA communication and a case where all users do not carry out HSDPA communication will be explained. Every time the control section (not shown) generates a connection instruction signal or release instruction signal for each sector, the transmission sector selection switch section 204 and reception sector selection switch section 201 add or delete some of the A-DPCH processing circuits 202-1 to **202-*n* to/from the sector in question, and thereby allocate more transmission signals to sectors with more users and allocate fewer transmission signals to sectors with fewer users. Furthermore, when the maximum packet transmission rate of each sector instructed from the control section (not shown) is high and resources for HS-PDSCH transmission provided for the HSDPA signal processing blocks 107-1 to 107-*n* are exhausted, the sector selection switch section 311 outputs packet data to arbitrary one sector. On the other hand, when the maximum packet transmission rate of each sector instructed from the control section (not shown) is low and there are sufficient resources for HS-PDSCH transmission provided for the HSDPA signal processing blocks 107-1** to 107-*n*, the sector selection switch section 311 allocates packet data so as to be output to a plurality of sectors.

Furthermore, when some users carry out HS-PDSCH transmission, the transmission sector selection switch section 204 and sector reception selection switch section 201 allocate transmission signals according to a connection instruction signal or release instruction signal for each sector from the control section (not shown) according to the number of users of each sector. In this case, the A-DPCH processing circuit which remains free after allocating the A-DPCH processing circuits 202-1 to **202-*n*** for HSDPA communication can also be used for services other than HSDPA communication (speech communication and packet communication using DPCH, TV telephone, etc.).

Thus, according to this embodiment, the A-DPCH signal processing blocks 106-1 to **106-*n* and HSDPA signal processing blocks 107-1 to 107-*n* are constructed separately and the system is adapted to an increase or decrease in the number of users by simply increasing or decreasing the number of A-DPCH signal processing blocks 106-1 to 106-*n*, and therefore it is possible to flexibly adapt the system according to the number of users. Furthermore, when the number of users is small, a necessary minimum number of A-DPCH signal processing blocks 106-1 to 106-*n* are provided and it is thereby possible to reduce initial introduction cost. Furthermore, the transmission sector selection switch section 204, reception sector selection switch section 201 and sector selection switch section 311 allocate transmission signals and packet data according to the number of users who carry out HSDPA communication for each sector and the maximum packet transmission rate of each sector, and it is thereby possible to use A-DPCH, HS-PDSCH and HS-SCCH channels effectively. Furthermore, by increasing or decreasing the number of A-DPCH processing circuits 202-1 to 202-*n* of the A-DPCH signal processing blocks 106-1 to 106-*n*** according to the number of users, it is possible to respond to an increase or decrease in the number of users economically using a simple method in the case where the increase or decrease in the number of users is small, etc.

Embodiment 2

Figure 4:
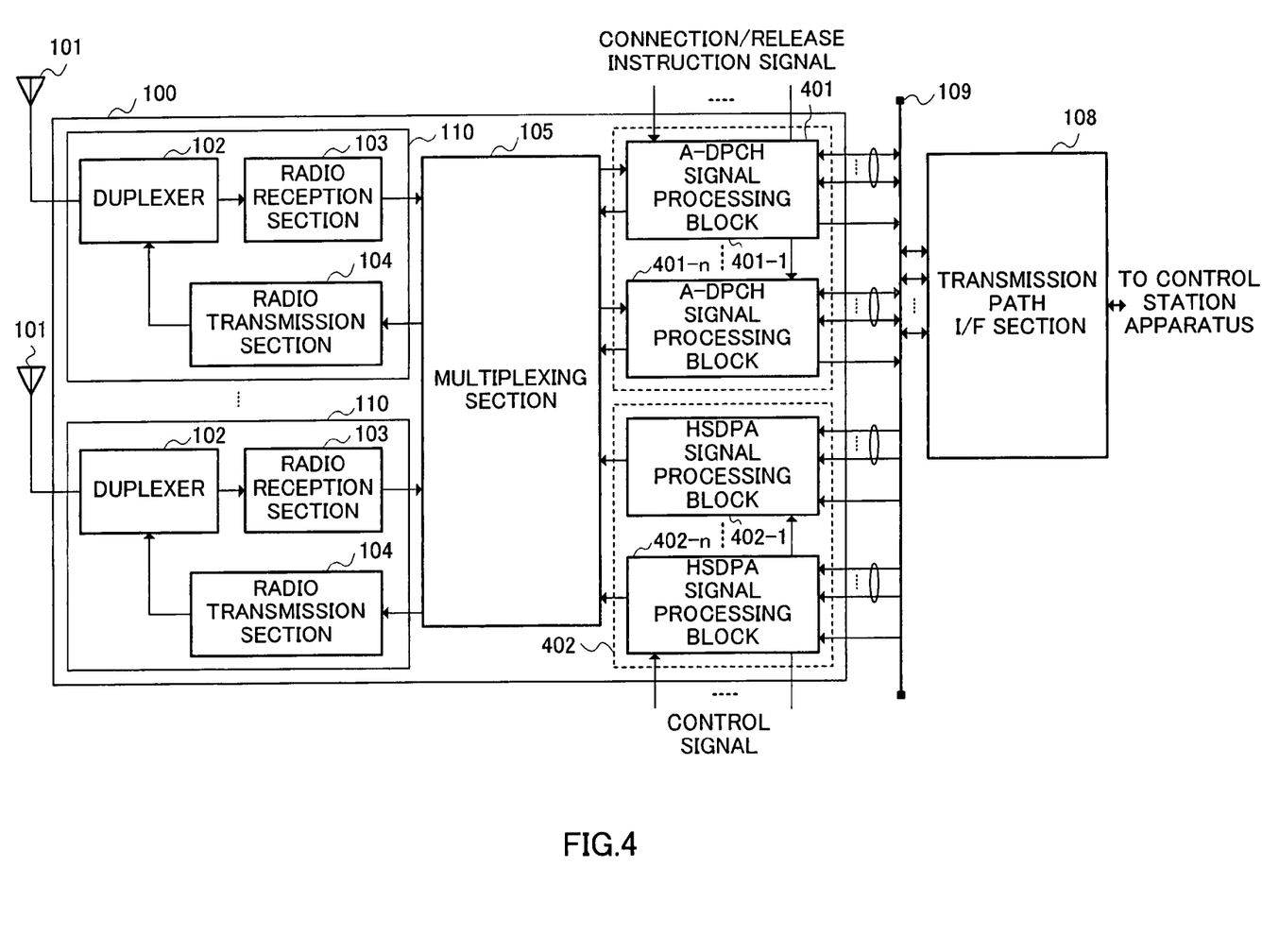
FIG. 4 is a block diagram showing a configuration of a radio apparatus according to Embodiment 2 of the present invention.
Figure 5:
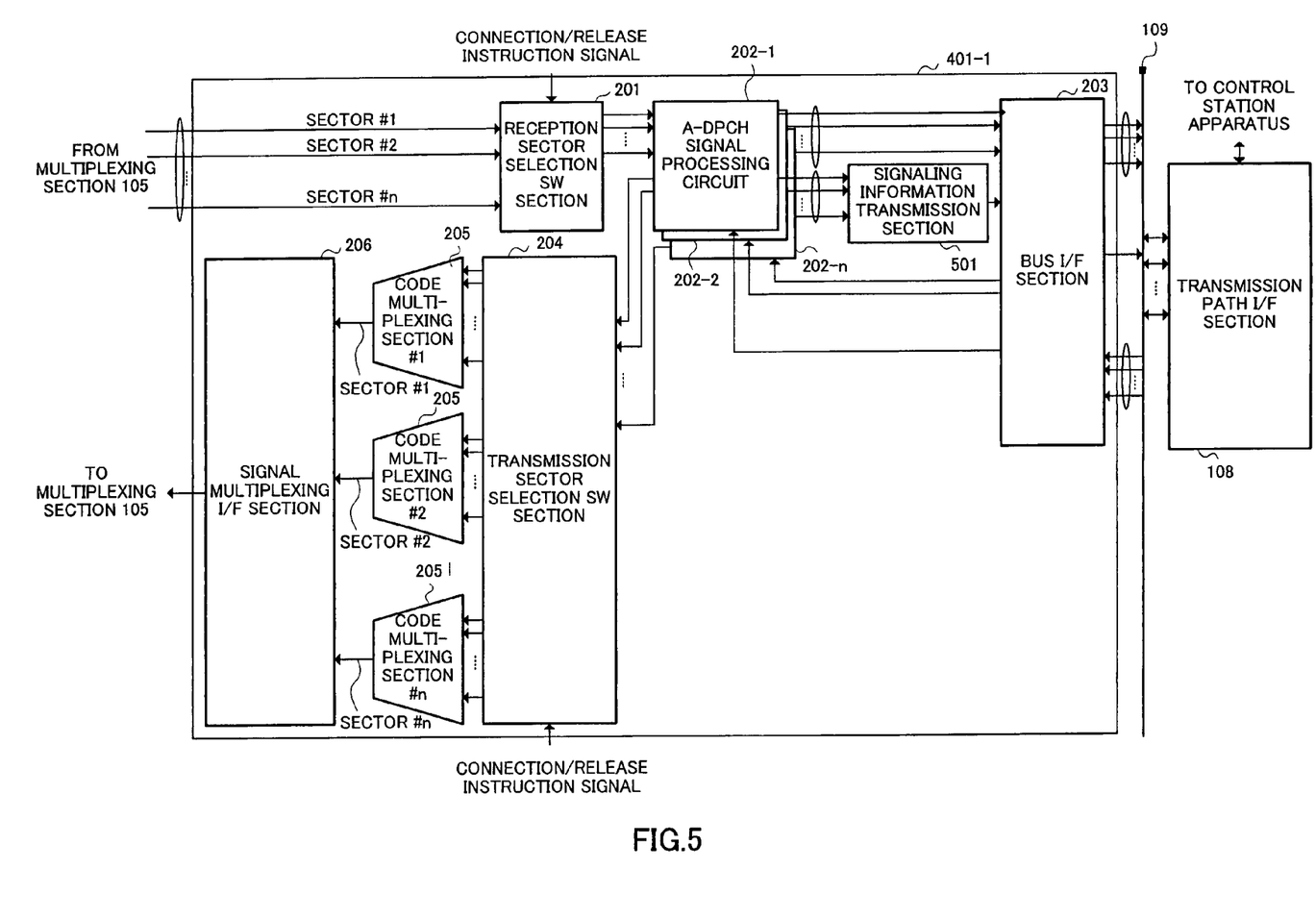
FIG. 5 is a block diagram showing a configuration of an A-DPCH signal processing block according to Embodiment 2 of the present invention.
Figure 6:
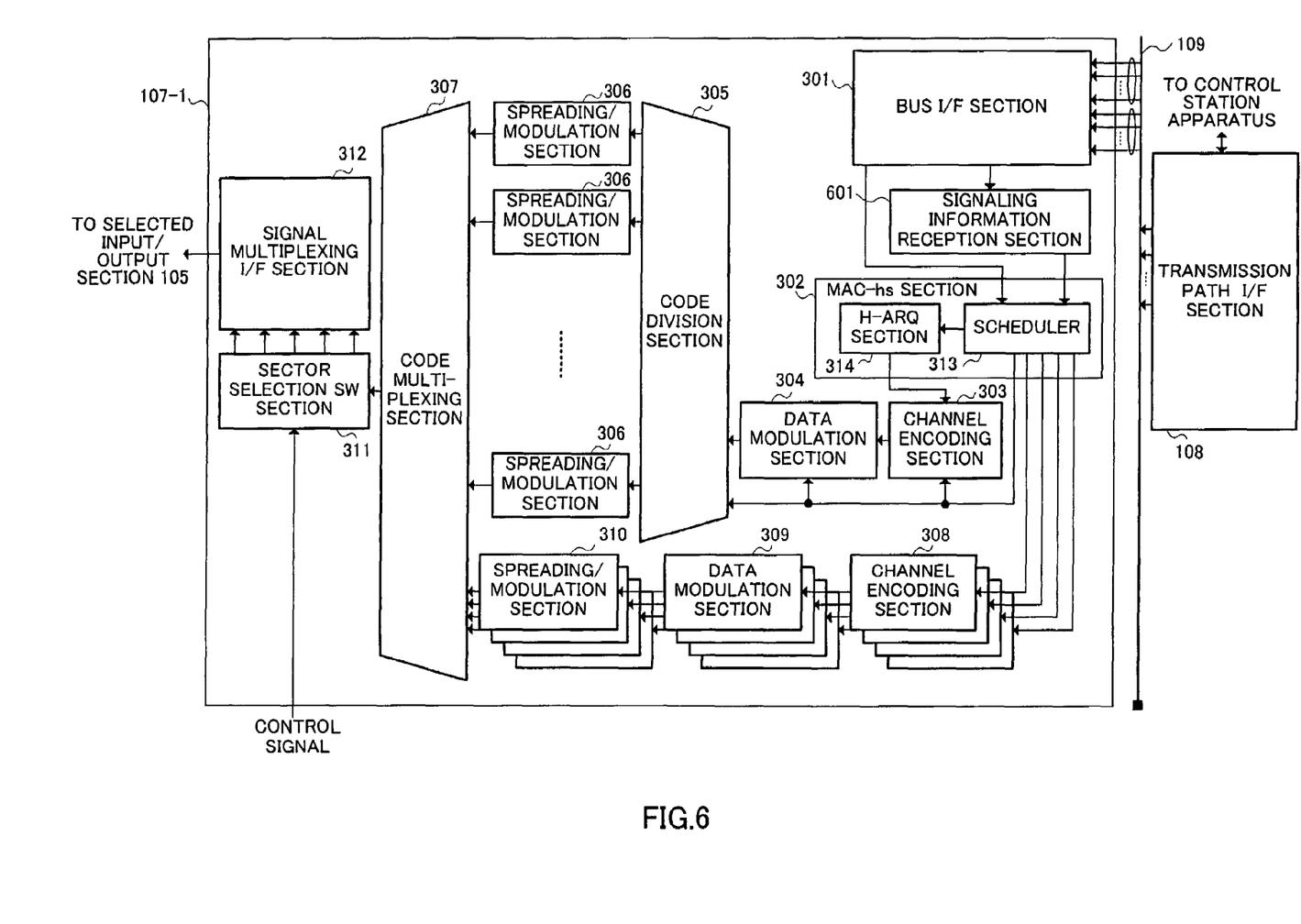
FIG. 6 is a block diagram showing a configuration of an HSDPA signal processing block according to Embodiment 2 of the present invention.

FIG. 4 shows a configuration of a radio apparatus 400 according to this embodiment, FIG. 5 shows a configuration of an A-DPCH signal processing block 401 and FIG. 6 shows a configuration of an HSDPA signal processing block 402. In this embodiment, the A-DPCH signal processing block 401 integrates a plurality of pieces of signaling information separated from various A-DPCH received signals and outputs the integrated information. The configuration providing a signaling information transmission section 501 in FIG. 5 differs from the configuration in FIG. 2 and the configuration providing a signaling information reception section 601 in FIG. 6 differs from the configuration in FIG. 3. The same components as those in FIG. 1, FIG. 2 and FIG. 3 are assigned the same reference numerals and explanations thereof will be omitted. Furthermore, in FIG. 5, the internal configurations of A-DPCH processing circuits 202-1 to **202-*n*** are omitted.

The signaling information transmission section 501 integrates pieces of signaling information input from a signaling information decision section 210 to generate integrated signaling information and outputs the integrated signaling information generated to a bus I/F section 203. As a specific example of integrating pieces of signaling information at the signaling information transmission section 501, it is possible to use an AAL (ATM adaptation layer) type 2 protocol. In this case, after each piece of signaling information is converted to a CPS (Common Part Sub-layer) packet, the packet data is multiplexed and output to the bus I/F section 203. When signaling information is converted to CPS packet, to identify from which A-DPCH processing circuit the signaling information is sent, at least a CID (Channel ID), etc., corresponding to the A-DPCH processing circuit is set in the CPS packet header so as to identify the user who sent the signaling information according to the CID. However, when pieces of signaling information are integrated, multiplexing should be performed on condition that the amount of delay of the received signal of each user can be reduced.

The signaling information reception section 601 outputs the integrated signaling information input from a bus I/F section 301 to a scheduler 313.

Then, only the part of operation which is different from the operation of above Embodiment 1 will be explained. The pieces of signaling information of the respective users output from the signaling information decision sections 210 are integrated into one by the signaling information transmission section 501 and input to the signaling information reception section 601 through the bus I/F section 203, transmission path I/F section 108 and bus I/F section 301.

Thus, according to this embodiment, in addition to the effect of above described Embodiment 1, the pieces of signaling information output from the signaling information decision sections 210 of the A-DPCH processing circuits 202-1 to **202-*n* are integrated by the signaling information transmission section 501 and the integrated signaling information is output from the A-DPCH signal processing blocks 401-1 to 401-*n* to the HSDPA signal processing blocks 402-1 to 402-*n*, and therefore the capacity of the transmission path for transmitting the signaling information is not constrained more than necessary. Furthermore, the integrated signaling information is transmitted from the A-DPCH signal processing blocks 401-1 to 401-*n* to the HSDPA signal processing blocks 402-1 to 402-*n***, and therefore transmission of other control data, etc., is not constrained by the transmission of signaling information and it is possible to transmit other control data, etc., smoothly.

Embodiment 3

Figure 7:
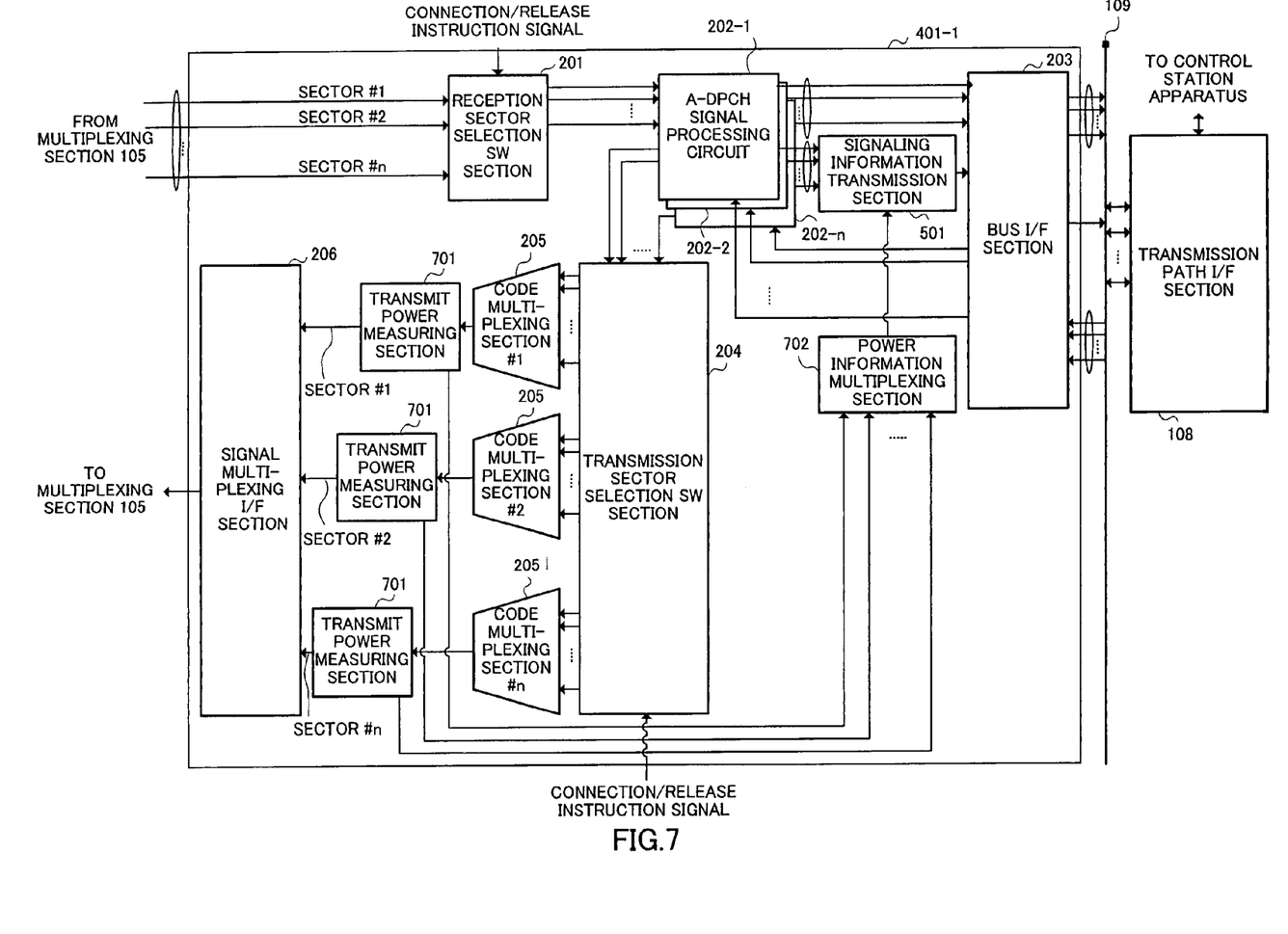
FIG. 7 is a block diagram showing a configuration of an A-DPCH signal processing block according to Embodiment 3 of the present invention.
Figure 8:
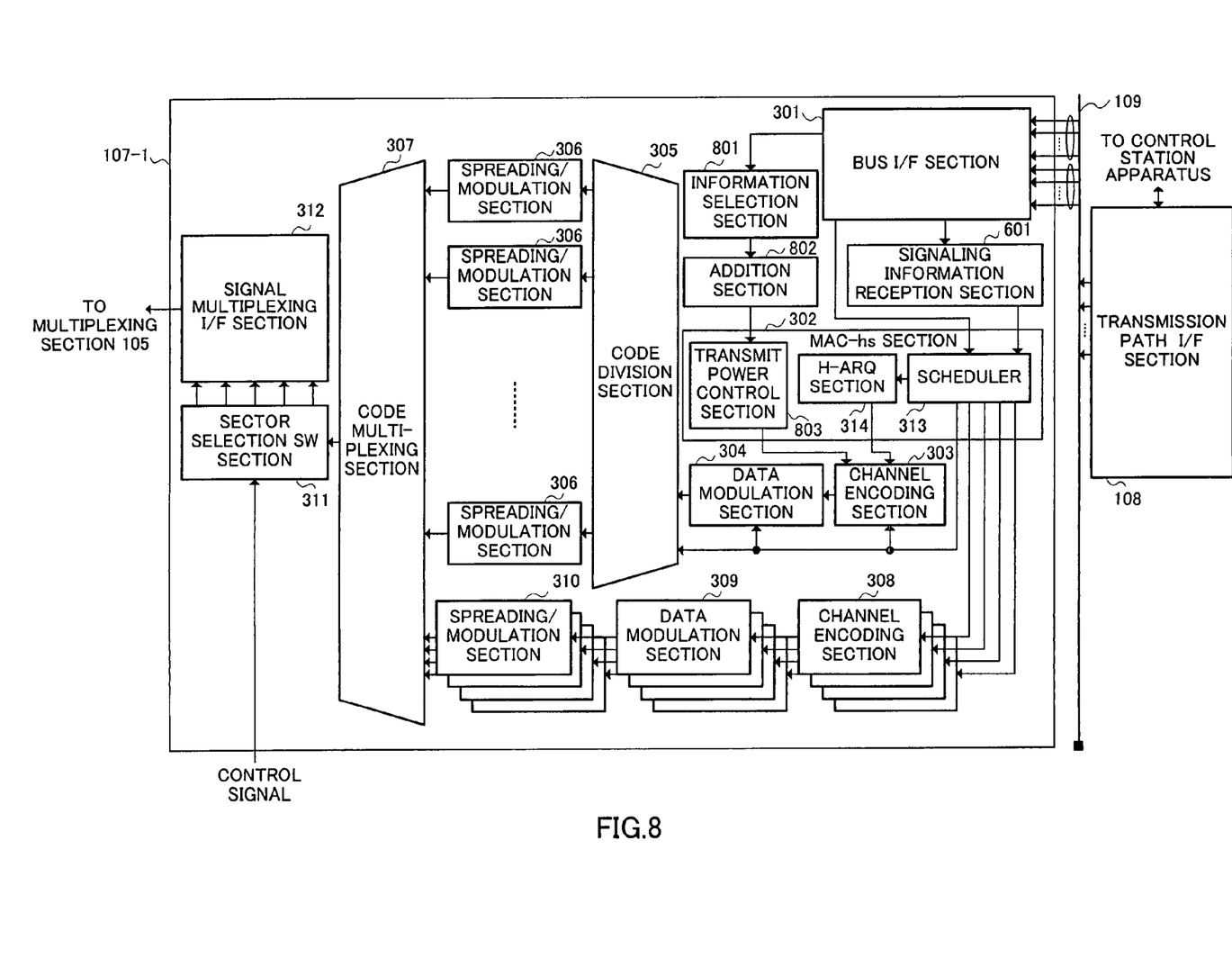
FIG. 8 is a block diagram showing a configuration of an HSDPA signal processing block according to Embodiment 3 of the present invention.

Since the overall configuration of a radio apparatus according to this embodiment is the same as that of Embodiment 2 (FIG. 4), explanations thereof will be omitted. FIG. 7 illustrates a configuration of an A-DPCH signal processing block 401 according to this embodiment and FIG. 8 illustrates a configuration of an HSDPA signal processing block 402. According to this embodiment, transmit power of a signal processed by the HSDPA signal processing section is determined from transmit power of a signal processed by the A-DPCH signal processing section and maximum transmit power which can be transmitted by the radio apparatus. The configuration providing transmit power measuring sections 701 and a power information multiplexing section 702 in FIG. 7 differs from the configuration in FIG. 5 and the configuration providing an information selection section 801, an addition section 802 and a transmit power control section 803 in FIG. 8 differs from the configuration in FIG. 6. The same components as those in FIG. 5 and FIG. 6 are assigned the same reference numerals and explanations thereof will be omitted.

The transmit power measuring sections 701 measure transmit power of transmission signals of their respective sectors. Here, as described above, when only some users carry out HSDPA communication, the free A-DPCH processing circuits 202-1 to 202-*n* can also be used for services other than HSDPA communication. That is, the A-DPCH processing circuits 202-1 to 202-*n* can also perform processing on channels other than A-DPCH such as DPCH. Therefore, when the A-DPCH signal processing blocks carry out processing on all channels other than HS-SCCH and HS-PDSCH relating to HSDPA communication, the transmit power measuring section 701 measures transmit power of all channels including shared channels sector by sector.

The power information multiplexing section 702 multiplexes pieces of information on transmit power of the respective sectors measured by the transmit power measuring sections 701 and outputs the transmit power information obtained to the signaling information transmission section 501. By multiplexing pieces of information on transmit power of the respective sectors, one transmission of transmit power information is all that is required and it is possible to suppress the capacity of the transmission path occupied by the transmit power information to a minimum.

The information selection section 801 selects transmit power corresponding to the sector for which the HSDPA signal processing block 402-1 carries out transmission from among the pieces of transmit power information included in the integrated signaling information input from the bus I/F section 301. In order to select transmit power for the sector corresponding to the HSDPA signal processing blocks 402-1 to 402-*n* to which itself belongs, the information selection section 801 shown in FIG. 8 selects transmit power for the sector corresponding to the HSDPA signal processing block 402-1.

The addition section 802 adds up transmit power indicated by the transmit power information selected by the information selection section 801 for each of the A-DPCH signal processing blocks 106-1 to 106-*n*. That is, the addition section 802 adds up transmit power measured by the A-DPCH signal processing blocks 106-1 to 106-*n* for the respective sectors corresponding to the HSDPA signal processing blocks 402-1 to 402-*n* to which the addition section 802 itself belongs.

The transmit power control section 803 subtracts the addition result by the addition section 802 from maximum transmit power that can be transmitted from the radio apparatus 400 and thereby decides transmit power of HS-SCCH and HS-PDSCH. This makes it possible to make the most of maximum transmit power that can be transmitted from the radio apparatus 400 and transmit HS-SCCH and HS-PDSCH transmission signals.

Then, only the part of operation which is different from above described Embodiments 1 and 2 will be explained. When transmission signals for the respective sectors are code-multiplexed by the code multiplexing section 205, the transmit power is measured by the transmit power measuring sections 701. The pieces of information on the measured transmit power are multiplexed by the power information multiplexing section 702 and output to a signaling information transmission section 501. The transmit power information obtained from the multiplexing at this time includes information on transmit power of all the sectors.

On the other hand, the pieces of signaling information on the respective users output from the A-DPCH processing circuits 202-1 to 202-*n* are integrated into one by the signaling information transmission section 501 and input to a bus I/F section 301 together with the transmit power information output from the power information multiplexing section 702 through a bus I/F section 203 and transmission path I/F section 108. At this time, the A-DPCH signal processing blocks 401-1 to 401-*n* measure transmit power of their respective sectors, transmit all the transmit power information to the HSDPA signal processing blocks 402-1 to 402-*n*, and therefore the pieces of transmit power information corresponding to the respective A-DPCH signal processing blocks 401-1 to 401-*n* are input to the bus I/F section 301 of the respective HSDPA signal processing blocks 402-1 to 402-*n*.

Then, the information selection section 801 selects transmit power of the sector corresponding to the HSDPA signal processing blocks 402-1 to 402-*n* to which the information selection section 801 itself belongs. Transmit power is selected for transmit power information transmitted from the respective A-DPCH signal processing blocks 401-1 to 401-*n*, and therefore n transmit powers are selected for each sector. The selected n transmit powers are added up by the addition section 802. In this way, total transmit power of channels other than HS-SCCH and HS-PDSCH in each sector is calculated.

Then, when the transmit power control section 803 subtracts the addition result of the addition section 802 from the maximum transmit power that can be transmitted by the radio apparatus 400, transmit powers of HS-SCCH and HS-PDSCH are calculated. The calculated transmit powers of HS-SCCH and HS-PDSCH are set in a transmit power control section (not shown) and the transmit powers of HS-SCCH and HS-PDSCH for each sector are controlled.

Thus, according to this embodiment, in addition to the effects of above described Embodiment 1 and Embodiment 2, the A-DPCH signal processing blocks 401-1 to 401-*n* measure transmit powers of dedicated channels and shared channels for each sector, subtracts transmit powers of the dedicated channels and shared channels from the maximum transmit power that can be transmitted by the radio apparatus 400 to determine transmit powers of HS-SCCH and HS-PDSCH, and can thereby extract the function of the radio apparatus to the full and improve the reception characteristics of HS-SCCH and HS-PDSCH signals.

The above described embodiments use a cell bus for data transmission between the transmission path I/F section, A-DPCH signal processing blocks and HSDPA signal processing blocks, but the present invention is not limited to this and any configuration is acceptable if it can at least perform multi-to-one communication using, for example, 100Base-TX and perform high-speed data transmission between the above described components.

As described above, the present invention is not subject to constraints on the number of users and can flexibly respond to an increase or decrease in the number of users and use free channels effectively.

This application is based on the Japanese Patent Application No. 2002-220318 filed on Jul. 29, 2002, entire content of which is expressly incorporated by reference herein.

INDUSTRIAL APPLICABILITY

The present invention is applicable to a radio apparatus and base station apparatus used in a radio communication system which performs high-speed packet transmission on a downlink.

What is claimed is:
1. A radio apparatus comprising:
dedicated channel signal processors that are provided in proportion to a number of users and that each separate signaling information from received signals of the users;

high speed transmission channel signal processors that are provided in proportion to a number of sectors covered by the radio apparatus, separately from the dedicated channel signal processors, and that each generate packet data based on the signaling information;
a radio transmitter that transmits the packet data; and
a bus that is provided between the dedicated channel signal processors and the high speed transmission channel signal processors and that transmits the signaling information to a high speed transmission channel signaling processor that is associated with a sector in which a user of a source of the signaling information is present.

2. The radio apparatus of claim 1, wherein the dedicated channel signal processors each comprise:
a plurality of dedicated channel signal processing circuits that each separate the signaling information from the received signals of the users; and
a switch that switches the users of the received signals processed in each dedicated channel signal processing circuit between the sectors in accordance with the number of the users in each sector.

3. The radio apparatus of claim 1, wherein:
the dedicated channel signal processors each generate integrated signaling information that integrates a plurality of signaling information; and
the high speed transmission channels signal processors each generate the packet data based on the integrated signaling information.

4. The radio apparatus of claim 1, wherein the radio transmitter transmits packet data switching destinations between the users across the sectors.

5. The radio apparatus of claim 1, wherein the radio transmitter transmits the packet data through HSDPA communication utilizing HS-PDSCH and HS-SCCH.

6. The radio apparatus of claim 1, wherein:
the dedicated channel signal processors each comprise:
a signal former that generates dedicated transmission signals on a per user basis; and
a power measurer that measures transmit power of a transmission signal including the dedicated transmission signals; and
the high speed transmission signal processors each set transmit power of the packet data based on the transmit power of the transmission signal measured by the power measurer.

7. The radio apparatus of claim 6, wherein the high speed transmission channel signal processors each subtract the transmit power measured by the power measurer from maximum transmit power the radio apparatus is able to employ, and calculates the transmit power of the packet data.

8. A base station apparatus comprising the radio apparatus of claim 1.

* * * * *